United States Patent [19]

Sato et al.

[11] 4,028,287
[45] June 7, 1977

[54] PROCESS FOR CONTINUOUS PREPARATION OF A FOAM POLYAMIDE

[75] Inventors: Shigetake Sato, Kamakura; Suminobu Kurahashi, Yokohama; Toru Okuyama, Yokohama; Noboru Hamada, Yokohama, all of Japan

[73] Assignee: Bridgestone Tire Company Limited, Tokyo, Japan

[22] Filed: June 4, 1975

[21] Appl. No.: 583,635

Related U.S. Application Data

[63] Continuation-in-part of Ser. No. 352,638, April 19, 1973, abandoned.

[30] Foreign Application Priority Data

Apr. 27, 1972 Japan .............................. 47-42463
Apr. 27, 1972 Japan .............................. 47-42466

[52] U.S. Cl. .......................... 260/2.5 N; 260/78 L
[51] Int. Cl.² .......................................... C08J 9/02
[58] Field of Search .................. 260/2.5 N, 78 L

[56] References Cited

UNITED STATES PATENTS

| | | | |
|---|---|---|---|
| 3,207,713 | 9/1965 | Hyde | 260/2.5 N |
| 3,234,152 | 2/1966 | Fuller | 260/2.5 N |
| 3,274,132 | 9/1966 | Giberson | 260/2.5 N |
| 3,316,221 | 4/1967 | Hyde | 260/2.5 N |
| 3,322,696 | 5/1967 | Fisher | 260/2.5 N |
| 3,332,895 | 7/1967 | Munn | 260/2.5 N |
| 3,376,237 | 4/1968 | Fuller | 260/2.5 N |
| 3,449,269 | 6/1969 | Hyde | 260/2.5 N |
| 3,547,836 | 12/1970 | Bruggeman | 260/2.5 N |
| 3,574,146 | 4/1971 | Schnell et al. | 260/2.5 N |
| 3,591,533 | 7/1971 | Schnell | 260/2.5 N |

Primary Examiner—Morton Foelak
Attorney, Agent, or Firm—Cooper, Dunham, Clark, Griffin & Moran

[57] ABSTRACT

Method for the preparation of a foam polyamide in which the lactam together with a basic catalyst at a temperature above the melting point of the lactam is mixed with the promoter and foaming agent in a mixing vessel at ambient temperature while subjecting the mix to violent agitation to initiate polymerization, and the mix is discharged into a container for completion of the reaction before polymerization is more than 10% complete.

17 Claims, 2 Drawing Figures

PROCESS FOR CONTINUOUS PREPARATION OF A FOAM POLYAMIDE

RELATED APPLICATION

This application is a continuation-in-part of application Ser. No. 352,638 which was filed on Apr. 19, 1973, now abandoned.

BACKGROUND OF THE INVENTION

1. Field of the Invention

This invention relates to a process for preparing a polyamide foam which may be carried out in a continuous manner.

2. Description of the Prior Art

Two processes are known to produce polyamide foams. One process consists in foaming an already formed polyamide polymer by adding a foaming agent. The other consists in simultaneous foaming and polymerization by lactam ring opening polymerization of a starting mixture containing a foaming agent.

The latter process is potentially superior because the latter process consists in performing a ring opening polymerization of a lactam and foaming simultaneously. However, it has not been used commercially because it has been a high temperature process requiring large equipment for controlling heat. Moreover, the additives such as foaming agents, foam stabilizers or pigments which can be employed are limited because they must be stable at high temperatures.

The only known process for continuous production of which the present coinventors are aware is the one that Bayer AG (West Germany) discloses in Kunstostoff Bd 59, 1969, Heft, Pages 13–20; Belgian Pat. No. 707,969, Dutch Pat. No. 6,709,848 and U.S. Pat. No. 3,574,146. It is not utilized commercially.

In one description of the Bayer process, a formate such as sodium formate is used as a foaming agent and catalyst. This method involves a one-component system in which all of the ingredients are initially mixed in a container at a relatively low temperature, e.g. 80° – 100° C. In order for reaction to take place, it is necessary to rapidly increase the temperature to about 200° C. This requires the use of a heat exchanger of very high capacity which markedly increases the engineering and operating costs of the process. Additionally, since the temperature in the container is necessarily high, it is not possible to use economical foaming agents such as volatile liquids or compounds which decompose to generate a gas, since these materials would vaporize or decompose prematurely. As a result, it is not possible to modify the density and other properties of the foam.

In another application of the Bayer process, as described, the reactants are initially separated into two compositions. One composition contains the selected lactam together with boron hydride as a catalyst. The second composition contains additional lactam plus an isocyanate promoter. The compositions are kept at a temperature of about 100° – 140° C, and the temperature is thereafter increased to above 160° C in the connecting pipes and the mixing vessels. Polymerization is completed in a separate container after discharge of the reaction mixture from the mixing vessel.

There are expensive engineering problems with this system because of the necessity for the stepwise elevation in temperature. Additionally, the boron hydride which is used as both catalyst and foaming agent is highly labile, and this introduces stability problems. With this process, as with the first process, there are limitations on the variability of the density and other properties of the foams which can be produced because volatile and decomposable foaming agents cannot be employed.

The deficiencies of the available processes for the production of polyamide foams has forced the art to actively seek other and more facile methods of production.

SUMMARY OF THE INVENTION

The process of this invention provides a procedure which substantially alleviates the problems of the prior art and makes possible the economical production of polyamide foams of various densities with a wide variety of useful properties with minimum engineering costs and difficulties. A special feature of the process is that volatile liquids and decomposable compounds can be employed as foaming agents. The process is especially useful for continuous operations, but may also be employed in the batchwise production of foams.

In accordance with the process of the invention, polyamide foams are formed by ring opening polymerization of polymerizable lactams in the presence of a basic catalyst, a promoter and a foaming agent. Auxiliary agents such as foam stabilizers, pigments and other conventional materials may be utilized in the process.

In the process, a first composition is prepared containing the selected lactam and basic catalyst. Mixing is best effected with stirring, but it is not essential. For reaction, this composition is maintained at a temperature above the melting point of the lactam. It is, therefore, a liquid, flowable composition. A second composition, which may also be formed with stirring, containing the selected promoter and foaming agent is also prepared. At least one of these agents is selected so as to be liquid at ambient temperature. This composition, therefore, is also liquid and flowable. The separate compositions are then conducted to a mixing or reaction vessel where they are subjected to violent agitation to initiate the polymerization reaction. Before the reaction is more than about 10% complete, the reacting mixture is discharged from the reaction vessel into a container for the completion of the reaction. The container may take any of a variety of forms. For batchwise production, it could be a stationary mold in the form of the desired final product. For continuous production, it could be a continuously moving, endless, open end mold which discharges the final polyamide product onto a receiving belt for transportation to a storage area.

DESCRIPTION OF THE PREFERRED EMBODIMENTS

Figure 1:
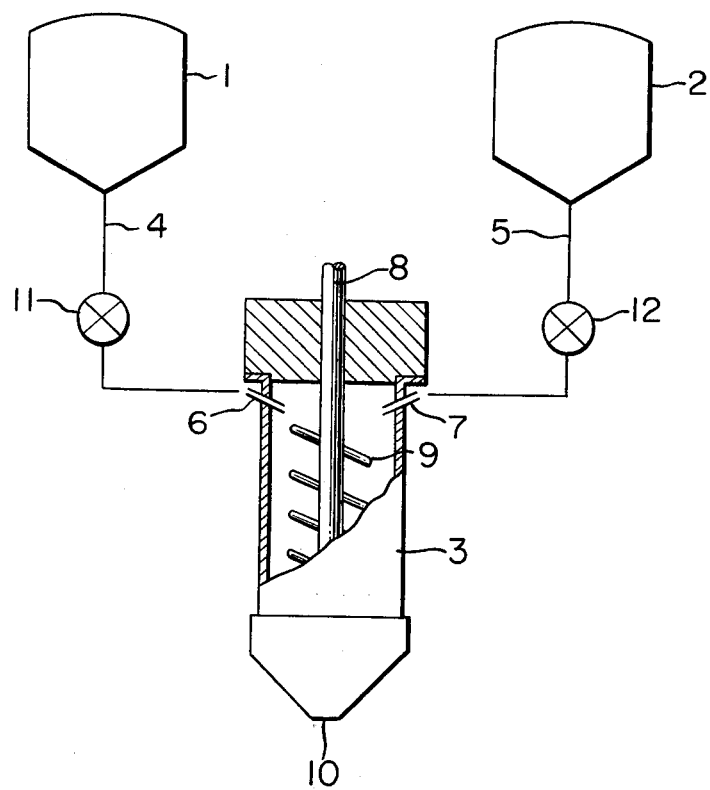
FIG. 1 is a flow diagram illustrating one embodiment of the process of this invention.

The first composition of this invention contains at least the selected lactam and the basic catalyst. It is stored in tank 1 and maintained at a temperature higher than the melting point of the lactam. Typically the temperature will be from about 70° – 180° C. The optimum temperature range operable with most lactams utilized in this invention is 100° – 160° C. The most widely employed lactam is ε-caprolactam, and with this polymerizable lactam the preferred temperature range is from 120° – 160° C. The elevated temperature is, of course, maintained in pipe 4 and valve 11 to permit free flow of the liquid composition. Since the process of the invention does not require either rapid elevation or stepwise elevation of the temperature, there is no necessity for high capacity heat exchangers or other special equipment. Instead heating can be effected with conventional equipment such as steam heaters, and the like.

It is best, although not essential, to seal the composition in tank 1 under an inert atmosphere, preferably nitrogen.

While the principal components of the first composition are the lactam and the catalysts, other ingredients, such as pigments can also be included so long as they are heat stable at the selected temperature and do not adversely affect the principal components.

The second composition used in the invention is stored in tank 2. This composition comprises as its principal ingredients, the promoter and the foaming agent. As will be apparent from the more specific descriptions hereinafter, these components may be selected from materials which may be either solid or liquid at ordinary temperatures. In the practice of the invention, the compositions are selected so that at least one of the principal components is a liquid at the temperature of the storage tank.

The second composition may also contain additional ingredients such as pigments or foam stabilizers. It is often convenient to include some portion of the lactam reactant in this composition as an aid to controlling the viscosity of the composition, and therefore its rate of flow into mixing or reacting vessel 3.

Since this second composition is maintained at room temperature, i.e., about 20° – 40° C, no heating equipment is necessary. Moreover, because elevated temperatures are not employed, volatile liquid foaming agents and low temperature decomposable foaming agents can be used.

The compositions are mixed in mixing tank 3 under violent agitation to insure uniform mixing and proper reaction. While propeller type agitation is most convenient, either devices such as vibrators, magnetically driven mixing rods, and the like can also be utilized.

The reacting mixture is discharged from the reaction vessel before more than about 10% of the reaction is completed. It is preferred, however, to discharge the mixture before more than 5% of the reaction has taken place. It has been observed, in fact, that best results are obtained if the mixture is discharged in the container for completion of the reaction, when only 1% or even less of the reaction has taken place.

It has been found that after appreciably more than 10% of the reaction takes place, the mixture becomes so viscous that it is difficult to cause it to flow from the reactor. When the conversion reaches 20% or more, it is extremely difficult to discharge the mixture. An additional difficulty is that as the viscosity of the mixture increases, more and more air is forced into the mix under the conditions of violent agitation, with the result that the cell structure of the final foam is not uniform.

The lactams used in this invention include any of those conventionally employed in the preparation of polyamide foams, and may contain as many as 12, 13 or even more carbon atoms. Typically useful monomers which may be mentioned by way of example include γ-butyrolactam, δ-valerolactam, ε-caprolactam, enantlactam and dodecanolactam. Copolymeric foams can be prepared by employing mixtures of starting materials.

Any of a wide variety of basic catalysts can be employed including, for example, hydrides, hydroxides, oxides or carbonates of alkali and alkaline earth metals. The reaction products of these materials with lactams can also be utilized. Alkali metal salts of lactams, particularly sodium and potassium caprolactam are particularly useful.

The amount of catalyst used in the reaction can be varied appreciably although an excess quantity of catalyst can adversely affect the quantity and quality of the final product. Generally from about 1/50 – 1/500 mole of catalyst per mol of lactam is suitable. The preferred quantity, in consideration of economics and yield is from 1/20 – 1/100 mole per mole of lactam.

Those promoters which are conventionally employed in the preparation of polyamide foams may also be used in carrying out the process of this invention. These include, for example, carbodiimide, phosphorous trichloride, acyl halides, acyl lactams, urethanes and the like. Isocyanates, especially aliphatic and cyclic aliphatic isocyanates such as hexamethylene diisocyanate, cyclohexyl isocyanate, and hydrogenated diphenylmethane-4,4'-diisocyanate are especially useful. Hexamethylene diisocyanate is espcially preferred.

The amount of promoter which is suitable for most purposes is from about 1/5 – 1/1000 mole per mole of lactam. While some variation from this range can be tolerated without adverse effect, it is best to stay within or close to this range to maintain a proper balance between rate of polymerization and rate of gas production so as to produce foam of good quality. The preferred range for maintaining the aforesaid balance is from 1/10 – 1/100 mole per mole of lactam. While these ranges are generally applicable to most promoters, they are particularly applicable to isocyanate type promoters. The optimum promoter and the amount thereof for a particular polymerization may be determined by a few simple observations.

As aforesaid, the foaming agents utilizable in this invention include both volatile liquids and decomposable compounds. Organic liquids, especially those boiling at 50° – 180° C are especially useful. Hydrocarbon liquids, both aliphatic and aromatic, such as benzene, toluene, xylene, cyclohexane, n-hexane, n-heptane, petroleum ether, n-pentane, petroleum benzine and ligroin are especially preferred because they are readily available and substantially chemically inert under the conditions of the reaction. Other volatile liquids, for instance dioxane, can also be employed. Typical decomposable gas producing compounds include azodicarboxylic amide, azo-bisisobutyronitrile, and dinitrosopentamethylene tetramine. Mixtures of foaming agents, including mixtures incorporating both types of foaming agents can often be advantageously employed. The amount of foaming agent utilized will vary widely depending principally upon the desired foam density, although other factors well known to those skilled in the art will also be considered. Generally, the amount used is of the same general order of magnitude as that employed with previously known foaming techniques.

Silicones are the preferred foam stabilizers.

It is not necessary to carry out this reaction in an inert atmosphere.

Auxiliary agents which may be included in the reaction mixture include dyes, pigments and inorganic fillers such as glass fiber, talc and the like.

FIG. 1 is a flow diagram of the process of this invention. Composition one is mixed in storage tank 1, and a promoter, a foaming agent and possibly other auxiliary agents are mixed in storage tank 2. The temperature of tank 1 and pipe 4 connecting from tank 1 to mixing vessel 3 is kept at about 70°–150° C. It is not necessary to heat tank 2 and pipe 5 which may be at room temperature.

The compositions are introduced to the mixing vessel 3 through inlets 6 and 7 from pipes 4 and 5 which include control valves 11 and 12 adjusted to maintain a constant flow of reactants. The mixture is rapidly agitated and mixed by the agitator 8 having an impeller 9 in the mixing vessel 3. The temperature of the mixture in the mixing vessel is higher than the melting point of the lactam, but a heating apparatus is not always necessary since the mixture is rapidly agitated. Agitation should be completed before the conversion reaches 10%, preferably 5% and particularly preferably 1% and thereafter the mixture is discharged from the outlet 10 at the bottom of the mixing vessel to the mould.

The principal features of this invention are:
a. Only the first composition is heated, and the temperature of storage tank 1 and the attached piping may be constant so that stepwise elevation of the temperature of the system is not necessary.
b. The design of the foaming system is relatively simple, especially with respect to heat sources, so that engineering and operating cost are minimized.
c. The reactants, especially the catalysts, are stable so that their pot life is long.
d. A wide variety of foaming agents may be utilized.
e. The operation of the mixing vessel is simple.
f. Viscosity of the second composition may be controlled by the admixture of small amounts of the polymerizable lactam so that problems of uniform mixing are minimized.
g. The second composition need not be heated and may be kept at room temperature. Accordingly, no heating source is necessary. This makes it possible to utilize both decomposable and volatile foaming agents. The fact that the second composition may be kept or stored at room temperature is especially important, since in order to conduct foam production is an efficient, continuous manner it is desirable to avoid any necessity of mixing the reacting compositions immediately prior to use. In contrast with prior art compositions which have been stored at elevated temperatures and produced foams with densities which varied in an uncontrollable manner, the foams of this invention have predicable and controllable densities. This feature of the invention is illustrated in Comparative Example 2.

The following non-limiting examples are given by way of illustration only.

EXAMPLE 1

Compositions 1 and 2 as shown in Table 1 were prepared and stored in storage tanks 1 and 2, respectively. The temperature of the storage tank 1 was maintained at about 135° C, and the first composition was mixed with stirring. The second composition was mixed with stirring in storage tank 2 at room temperature (about 25° C). The second composition, it will be noted, was prepared utilizing two kinds of promoter, i.e. hexamethylene diisocyanate and benzoyl chloride.

TABLE 1

| Composition-1 | $\epsilon$-caprolactam | 20.0 | Kg |
|---|---|---|---|
| | Sodium caprolactam | 0.8 | Kg |
| Composition-2 | Hexamethylene diisocyanate | 0.76 | Kg |
| | Benzoyl chloride | 0.64 | Kg |
| | Silicone oil (SH-193, trade name, manufactured by Toray Silicone Co., Ltd.) | 0.2 | Kg |
| | Toluene | 2.1 | Kg |

The temperature of pipe 4 for the composition-1 was maintained at about 135° C while that of a pipe 5 for the composition-2 was maintained at room temperature. The compositions were introduced into the mixing vessel 3 through inlets 6 and 7 which were separately fitted to the mixing vessel 3. The mixing rates were 6.7 Kg/min. and 1.55 Kg/min., respectively. The mixture was stirred and mixed with stirring device 8 equipped with stirring pins 9 in mixing vessel 3. The resulting mixture was continuously discharged onto a moulding surface though discharging outlet 10 fitted to the bottom part to obtain a light yellow foam product having homogeneous cells, and the density was 0.035 g/cm$^3$. In this case, the conversion of the $\epsilon$-caprolactam at the time discharge from the mixing vessel was less than 1%.

COMPARATIVE EXAMPLE 1

Compositions-1 and -2 were introduced into the mixing vessel 3 for 3 seconds under the same mixing conditions as those of Example 1, stirred for 12 seconds while the discharging outlet 10 was shut and then the resulting mixture was discharged onto a moulding surface by opening the discharging outlet 10. The conversion of the $\epsilon$-caprolactam immediately after discharge from the mixing vessel was about 25%, and the foaming had been carried out already before discharge. And thus, the severe loading occurred in the mixing vessel 3. The resulting foam product contained heterogeneous cells and had many hollow portions as much as 3–8 mm in diameter in the upper part.

EXAMPLE 2

Compositions-1 and -2 were prepared as shown in Table 2 in the same manner as described in Example 1. The temperature of composition-1 was controlled at 130° C.

TABLE 2

| Composition-1 | $\epsilon$-caprolactam | 19.4 | Kg |
|---|---|---|---|
| | Sodium caprolactam | 0.3 | Kg |
| | $\epsilon$-caprolactam | 0.6 | Kg |
| Composition-2 | Hexamethylene diisocyanate | 0.6 | Kg |
| | Silicone oil (SH-193, trade name, manufactured by Toray Silicone Co., Ltd.) | 0.4 | Kg |
| | Toluene | 2.5 | Kg |

The reaction of this example was carried out by using hexamethylene diisocyanate only as a promoter and adding a part of the lactam to the composition-2. The temperature of the pipe 4 was maintained at 130° C and that of the pipe 5 was room temperature. Then the compositions-1 and -2 were introduced separately into the mixing vessel 3 at the rates of 7.2 Kg/min. and 1.4 Kg/min., respectively, stirred, mixed, continuously discharged through the discharging outlet 10 and foamed in the preheated mould. The obtained foam product was a light yellow foam product having homogeneous fine cells, and the density was 0.032 g/cm³. Further, when discharged, the conversion was less than 1%.

EXAMPLE 3

In a manner similar to Example 1, composition-1 and composition-2 were prepared under the mixing conditions as shown in Table 3, and a foam product was obtained in the same manner as described in Example 1.

TABLE 3

| Composition-1 | ε-caprolactam | 9.8 | Kg |
|---|---|---|---|
| | Sodium caprolactam | 0.24 | Kg |
| | ε-caprolactam | 0.2 | Kg |
| | Acetyl caprolactam | 0.57 | Kg |
| Composition-2 | Silicone oil (SH-193, trade name, manufactured by Toray Silicone Co., Ltd.) | 0.2 | Kg |
| | Toluene | 0.8 | Kg |

In this case, the mixing rates and temperature of composition-1 and composition-2 were 6 Kg/min. (155° C) and 0.98 Kg/min. (25° C), respectively, and the conversion immediately after discharge was less than 1%. The density of the foam product thus obtained was 0.068 g/cm³.

EXAMPLE 4

The compositions as shown in Table 4 were prepared and treated in the same manner as described in Example 1 to obtain a foam product.

TABLE 4

| Composition-1 | ε-caprolactam | 18.8 | Kg |
|---|---|---|---|
| | Sodium caprolactam | 0.8 | Kg |
| Composition-2 | ε-caprolactam | 1.2 | Kg |
| | Hexamethylene diisocyanate | 0.76 | Kg |
| | Benzoyl chloride | 0.64 | Kg |
| | Silicone oil (SH-200, trade name, maufactured by Toray Silicone Co., Ltd.) | 0.2 | Kg |
| | Toluene | 1.05 | Kg |
| | n-hexane | 1.05 | Kg |

The mixing rates of composition-1 and composition-2 were 14.4 Kg/min. and 2.95 Kg/min., respectively. This example is given to illustrate a reaction carried out by the combined use of two types of foaming agent as well as two types of promoter. The foam product had a density of 0.038 g/cm³. Further, when discharged, the conversion was less than 1%.

EXAMPLE 5

Compositions-1 and -2 were prepared under the mixing conditions shown in Table 5, and a foam product was obtained in the same manner as described in Example 1.

TABLE 5

| Composition-1 | ε-caprolactam | 18.34 | KG |
|---|---|---|---|
| | Dodecanolactam | 1.66 | KG |
| | Sodium Caprolactam | 0.4 | Kg |
| Composition-2 | Hexamethylene diisocyanate | 0.5 | Kg |
| | Silicone oil (SH-193, trade name, manufactured by Toray Silicone Co., Ltd.) | 0.2 | Kg |
| | Toluene | 1.2 | Kg |

The mixing rates and temperatures of Compositions-1 and -2 were 10 Kg/min. (128° C) and 0.93 Kg/min. (25° C), respectively. The degree of conversion measured just after discharging was less than 1%. The density of the foam product was 0.069 g/cm³.

EXAMPLE 6

Compositions-1 and -2 were prepared under the mixing conditions shown in Table 6, and a foam product was obtained in the same manner as described in Example 1.

TABLE 6

| Composition-1 | ε-caprolactam | 20 | Kg |
|---|---|---|---|
| | Sodium Caprolactam | 0.4 | Kg |
| Composition-2 | m-Xylene diisocyanate | 0.94 | Kg |
| | Silicone oil (SH-193, trade name, manufactured by Toray Silicone Co., Ltd.) | 0.2 | Kg |
| | Toluene | 2.0 | Kg |

The mixing rates and temperature of Compositions-1 and -2 were 12 Kg/min. (138° C) and 1.85 Kg/min. (25° C), respectively. The degree of conversion measured just after discharging was less than 1%. The density of the foam product obtained was 0.42 g/cm³.

EXAMPLE 7

Compositions-1 and -2 were prepared under the mixing conditions as shown in Table 7, and a foam product was obtained in the same manner described in Example 1.

TABLE 7

| Composition-1 | ε-caprolactam | 19.8 | Kg |
|---|---|---|---|
| | Sodium Caprolactam | 0.4 | Kg |
| Composition-2 | ε-caprolactam | 0.2 | Kg |
| | Hydrogenated diphenyl methane diisocyanate | 1.24 | Kg |
| | Silicone oil (SH-193, trade name, manufactured by Toray Silicone Co., Ltd.) | 0.2 | Kg |
| | Isooctane | 1.2 | Kg |

The mixing rates and temperature of Compositions-1 and -2 were 10 Kg/min. (125° C) and 1.4 Kg/min. (25° C), respectively. The conversion measured just after discharging was less than 1%. The density of the foam product obtained was 0.074 g/cm³.

COMPARATIVE EXAMPLE 2

This example shows the effect of storage of the second composition at ambient and at elevated temperatures.

Composition-1 was prepared by mixing 50 parts by weight of ε-caprolactam and 1 part by weight of sodium caprolactam at 135° C in the storage tank.

The two kinds of "Composition-2" were prepared; that is, the one (Composition-2A) was prepared by mixing 0.5 Kg of hexamethylene diisocyanate, 0.2 Kg of silicone oil (SH-193, trade name, manufactured by Toray Silicone Co., Ltd.) and 2 Kg of toluene at 130° C in a tank (capacity: 10l) and the other (Composition-2B) was prepared by mixing the same materials as that mentioned above at room temperature in another tank (capacity: 10l).

Compositions-2A and -2B were stored for the periods indicated in Table 8 at the stated intervals of time after preparation of the compositions. 51g of Composition-1 and 6.75 g of Composition-2A or 2B were drawn up into a mixing vessel and then immediately were mixed with stirring. The mixture was transferred to a small vessel to foam. The density of the foam product was measured.

Figure 2:
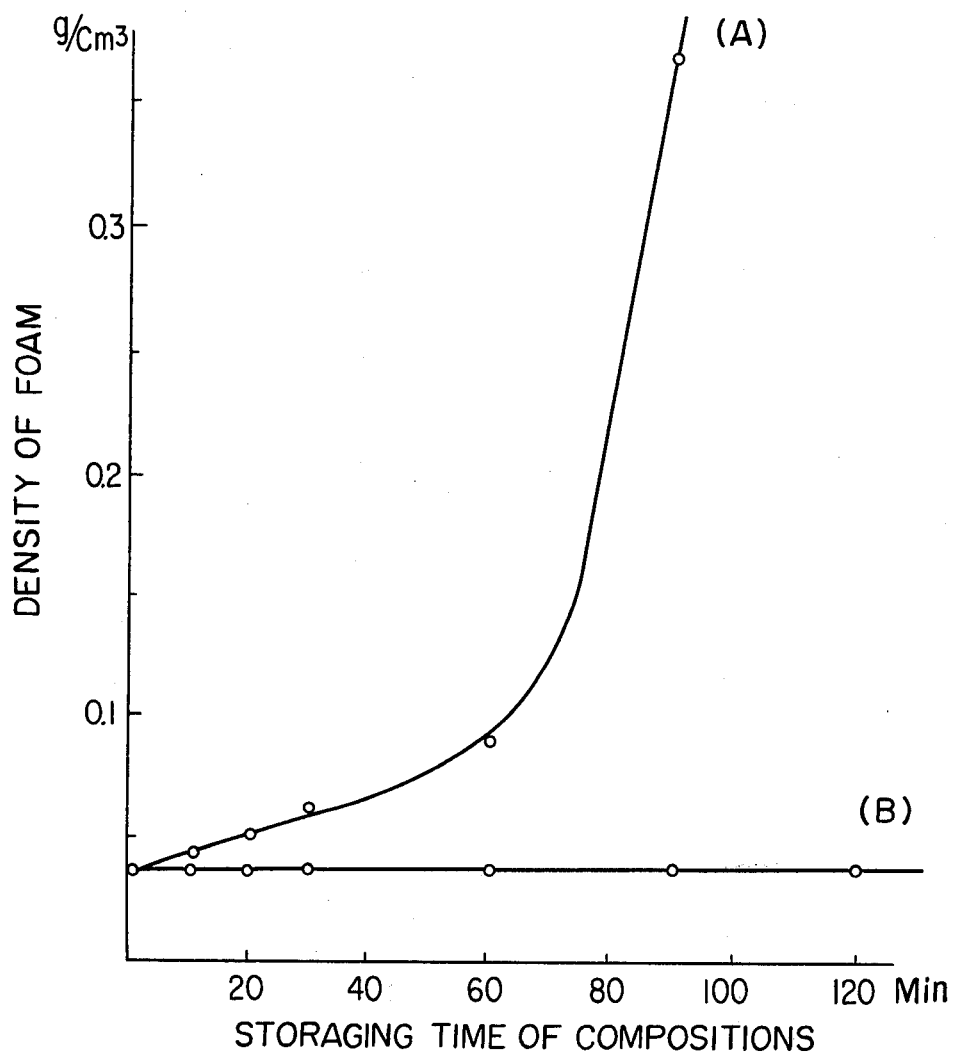
FIG. 2 is a graph of storage time versus density of foam.

The results are as shown in Table 8 and FIG. 2.

TABLE 8

| Storage Time of Composition | | Density of Foam A | Density of Foam B |
|---|---|---|---|
| 1 | Min. | 0.038 g/cm³ | 0.038 g/cm³ |
| 10 | | 0.045 | 0.038 |
| 20 | | 0.052 | 0.038 |
| 30 | | 0.064 | 0.038 |
| 60 | | 0.091 | 0.038 |
| 90 | | 0.368 | 0.038 |
| 120 | | not foam | 0.038 |

Note:
A: Foam produced by using Composition-2A (stored at 130° C)
Note:
B: Foam produced by using Composition-2B (stored at room temperature)

Storage time of composition is the time from preparation to the time mixing is initiated.

As shown in the table, the density of the foam product produced by the process of the invention does not change with storage time of Composition-2 at room temperature, but changes appreciably with storage at elevated temperature in accordance with previously described processes.

COMPARATIVE EXAMPLE 3

This example shows the importance of degree of conversion in the continuous foaming operation of this invention.

The mixture of 100g of ε-caprolactam and 2g of sodium caprolactam was placed in a stainless beaker and melted at about 135° C. To the above mixture were added 2.5g of hexamethylene diisocyanate, 1.0g of silicone oil (SH-193, trade name, manufactured by Toray Silicone Co., Ltd.) and 2.0g of toluene, and then immediately were stirred by a stirring machine. The resulting mixture was poured into water within 1 second. The conversion of the resulting mixture and the weight of the mixture sticking to the beaker and the stirring machine were measured.

The above experiment was repeated by using various stirring times.

The results are shown in Table 9.

TABLE 9

| Conversion | Weight of the mixture sticking to the beaker and the stirring machine |
|---|---|
| 1.0 (%) | 5.5 (%) |
| 2.4 | 6.0 |
| 4.8 | 7.3 |
| 9.3 | 10.2 |
| 15.5 | 51.0 |

Table 9 shows that the viscosity of the mixture increases rapidly when the conversion is more than 10%. Accordingly, it is clearly anticipated that the mixture will stick to a mixing vessel or a nozzle of a foaming machine, when the conversion is more than 10%.

Therefore, the polymerization of the lactam is preferably less than 5% and most preferably less than 1% in the continuous production.

What is claimed is:

1. A process for the preparation of a polyamide foam by ring-opening polymerization of a polymerizable lactam in the presence of a basic catalyst, a promoter and a foaming agent which comprises the steps of:
   A. preparing a first composition containing the lactam and the catalyst at a temperature above the melting point of the lactam;
   B. preparing a second liquid composition containing the promoter and the foaming agent at room temperature without heating and maintaining it at room temperature;
   C. mixing said compositions at their preparation temperatures in a mixing vessel with violent agitation to initiate polymerization;
   D. discharging the reacting mixture into a container before polymerization of the lactam is more than 10% complete, and allowing the polymerization to run to completion.

2. A process in claim 1 carried out in a continuous manner.

3. A process as in claim 1 wherein the temperature of the first composition is from 70° to 180° C.

4. A process as in claim 1 wherein the reacting mixture is discharged before the reaction is more than 5% complete.

5. A process as in claim 1 wherein a portion of the lactam is dissolved in the second composition.

6. A process as in claim 1 wherein the lactam is ε-caprolactam.

7. A process as in claim 1 in which the amount of the basic catalyst is from about 1/5 – 1/500 mole per mole of lactam.

8. A process as in claim 1 in which the catalyst is sodium caprolactam.

9. A process as in claim 1 in which the amount of a promoter is from about 1/5 – 1/1000 mole per mole of lactam.

10. A process as in claim 1 in which the promoter is an aliphatic isocyanate.

11. A process as in claim 10 in which the promoter is hexamethylene diisocyanate.

12. The process according to claim 1 in which the foaming agent is selected from the group consisting of low boiling liquids which vaporize at the reaction temperature and compounds which decompose to form a gas at the reaction temperature.

13. A process as in claim 1 in which the foaming agent is toluene or n-hexane.

14. A process as in claim 1 in which the mixing vessel is equipped with an internal agitator and bottom outlet.

15. A process as in claim 1 in which at least one of the compositions contains at least one of a foam stabilizer and a pigment.

16. A process as in claim 15 in which the foam stabilizer is a silicone oil.

17. A process as in claim 1 in which the lactam is ε-caprolactam, its temperature is from 120° – 160° C, from 1/20 – 1/100 mole of sodium caprolactam for each mole of ε-caprolactam is used as the basic catalyst, from 1/10 – 1/100 mole of hexamethylene diisocyanate for each mole of ε-caprolactam is used as the foaming agent, and the reacting mixture is discharged from the mixing vessel before the reaction is more than 5% complete.

* * * * *